(12) United States Patent
Apte et al.

(10) Patent No.: US 10,380,778 B2
(45) Date of Patent: Aug. 13, 2019

(54) AUTOMATED CHART GENERATION WITHIN A DOCUMENT GENERATION APPLICATION USING HEURISTIC MODEL WITH PREDEFINED DATA TYPES

(71) Applicant: Dropbox, Inc., San Francisco, CA (US)

(72) Inventors: Renuka Apte, San Francisco, CA (US); Jennifer Lee, San Francisco, CA (US); Jan Spidlen, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 15/374,703

(22) Filed: Dec. 9, 2016

(65) Prior Publication Data

US 2018/0165851 A1 Jun. 14, 2018

(51) Int. Cl.
| | |
|---|---|
| *H03M 7/30* | (2006.01) |
| *H04N 1/41* | (2006.01) |
| *G06T 11/60* | (2006.01) |
| *G06T 11/20* | (2006.01) |
| *G06F 17/24* | (2006.01) |
| *G06F 16/34* | (2019.01) |
| *G06T 1/00* | (2006.01) |
| *G06F 16/901* | (2019.01) |
| *G06F 17/22* | (2006.01) |
| *G06F 17/21* | (2006.01) |

(52) U.S. Cl.
CPC .............. *G06T 11/60* (2013.01); *G06F 16/34* (2019.01); *G06F 17/245* (2013.01); *G06T 1/00* (2013.01); *G06T 11/206* (2013.01); *G06F 16/9024* (2019.01); *G06F 17/211* (2013.01); *G06F 17/2247* (2013.01); *G06F 17/243* (2013.01); *G06F 17/246* (2013.01)

(58) Field of Classification Search
CPC .... G06T 11/60; G06T 11/206; G06F 17/2247; G06F 17/245
USPC ......................................................... 715/209
See application file for complete search history.

(56) References Cited

U.S. PATENT DOCUMENTS

| | | | |
|---|---|---|---|
| 5,461,708 | A | 10/1995 | Kahn |
| 5,611,034 | A | 3/1997 | Makita |
| 7,593,013 | B2 | 9/2009 | Agutter et al. |
| 8,082,489 | B2 | 12/2011 | Jiang |
| 9,183,561 | B2 | 11/2015 | Hanumara et al. |
| 9,292,628 | B2 | 3/2016 | Beers et al. |
| 9,299,173 | B2 | 3/2016 | Rope et al. |
| 9,389,840 | B2 | 7/2016 | Mun |

(Continued)

*Primary Examiner* — Cesar B Paula
*Assistant Examiner* — Luu-Phuong T Nguyen
(74) *Attorney, Agent, or Firm* — Hickman Palermo Becker Bingham LLP (57) ABSTRACT

A method and apparatus for generating charts within a document generation application is provided. The method comprises, within a document generation application, tabular data; associating, for each column and each row of the tabular data, the labels and the numerical data contained therein with one of a plurality of data types; determining, without user input, that the tabular data is one of column-oriented or row-oriented; selecting the first column or the first row as corresponding to an x-axis, respectively; applying a heuristic model resulting in a selection of a chart type of a plurality of chart types, the selection made without user input; automatically generating a chart of the selected chart type depicting a graphical representation of the labels and the numerical data.

18 Claims, 8 Drawing Sheets

(56) References Cited

U.S. PATENT DOCUMENTS

| | | | | |
|---|---|---|---|---|
| 9,613,086 B1* | 4/2017 | Sherman | ............ | G06F 17/30389 |
| 2005/0060647 A1* | 3/2005 | Doan | ................ | G06F 17/30554 |
| | | | | 715/205 |
| 2006/0064632 A1* | 3/2006 | Vignet | ................... | G06T 11/206 |
| | | | | 715/211 |
| 2008/0195928 A1* | 8/2008 | Matsa | ................... | G06F 17/246 |
| | | | | 715/215 |
| 2009/0083619 A1* | 3/2009 | Davis | ............... | G06F 17/30014 |
| | | | | 715/234 |
| 2011/0148879 A1* | 6/2011 | Moreno | ................ | G06T 11/206 |
| | | | | 345/440 |
| 2013/0080444 A1* | 3/2013 | Wakefield | ......... | G06F 17/30994 |
| | | | | 707/748 |
| 2013/0097177 A1* | 4/2013 | Fan | ....................... | G06F 17/246 |
| | | | | 707/748 |
| 2013/0176315 A1* | 7/2013 | Winkle | ................... | G06T 11/20 |
| | | | | 345/440 |
| 2014/0078182 A1* | 3/2014 | Utsunomiya | ............ | G09G 5/37 |
| | | | | 345/666 |
| 2014/0184607 A1* | 7/2014 | Toyoshima | ......... | G06F 17/2765 |
| | | | | 345/440 |
| 2015/0170382 A1* | 6/2015 | Bhatia | .................... | G06T 11/20 |
| | | | | 345/440 |
| 2015/0262396 A1* | 9/2015 | Devarajan | ......... | G06F 17/30554 |
| | | | | 345/440.1 |
| 2016/0026695 A1* | 1/2016 | Fan | ....................... | G06F 17/246 |
| | | | | 707/723 |

* cited by examiner

AUTOMATED CHART GENERATION WITHIN A DOCUMENT GENERATION APPLICATION USING HEURISTIC MODEL WITH PREDEFINED DATA TYPES

FIELD

The present disclosure relates generally to a computer environment for storing heterogeneous data for multiple users while reducing memory and computing resources. The present disclosure relates more specifically to the management of tabular data in an electronic document.

BACKGROUND

Charts are used to convey large amounts of information and to capture the attention of a reader. For example, a chart showing a plot of data points may be used to compare changes in sets of data over a period of time. A pie chart can be used to illustrate the relative sizes of portions of a whole. Use of charts and other graphical elements may allow an author to provide the relevant data to the reader without writing out large sections of text.

In existing systems, the addition of a chart to a document is a time consuming and cumbersome process. An author may write a document in a word processing application. To add a chart, the author uses a spreadsheet application to generate a table of the data to be conveyed by the chart. The author then uses the spreadsheet application to select the data to be graphed, the type of chart to be generated, and how the data is to be presented. Upon generating the chart in the spreadsheet application, the author returns to the word processing application to import the chart from the spreadsheet application. The data used to create the chart is not accessible by the word processing application.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Systems and methods allow for automatic creation of charts within electronic documents. In some implementations, a chart is automatically created without requiring that the author leave the application in which the author is generating an electronic document. The application accesses tabular data and automatically, without user input, makes a series of determinations about the data. From these determinations, the application uses a heuristic model to automatically select at least one chart type from a plurality of stored chart types. The application generates one or more charts of the at least one selected chart type and adds the one or more charts to the electronic document.

Figure 8:
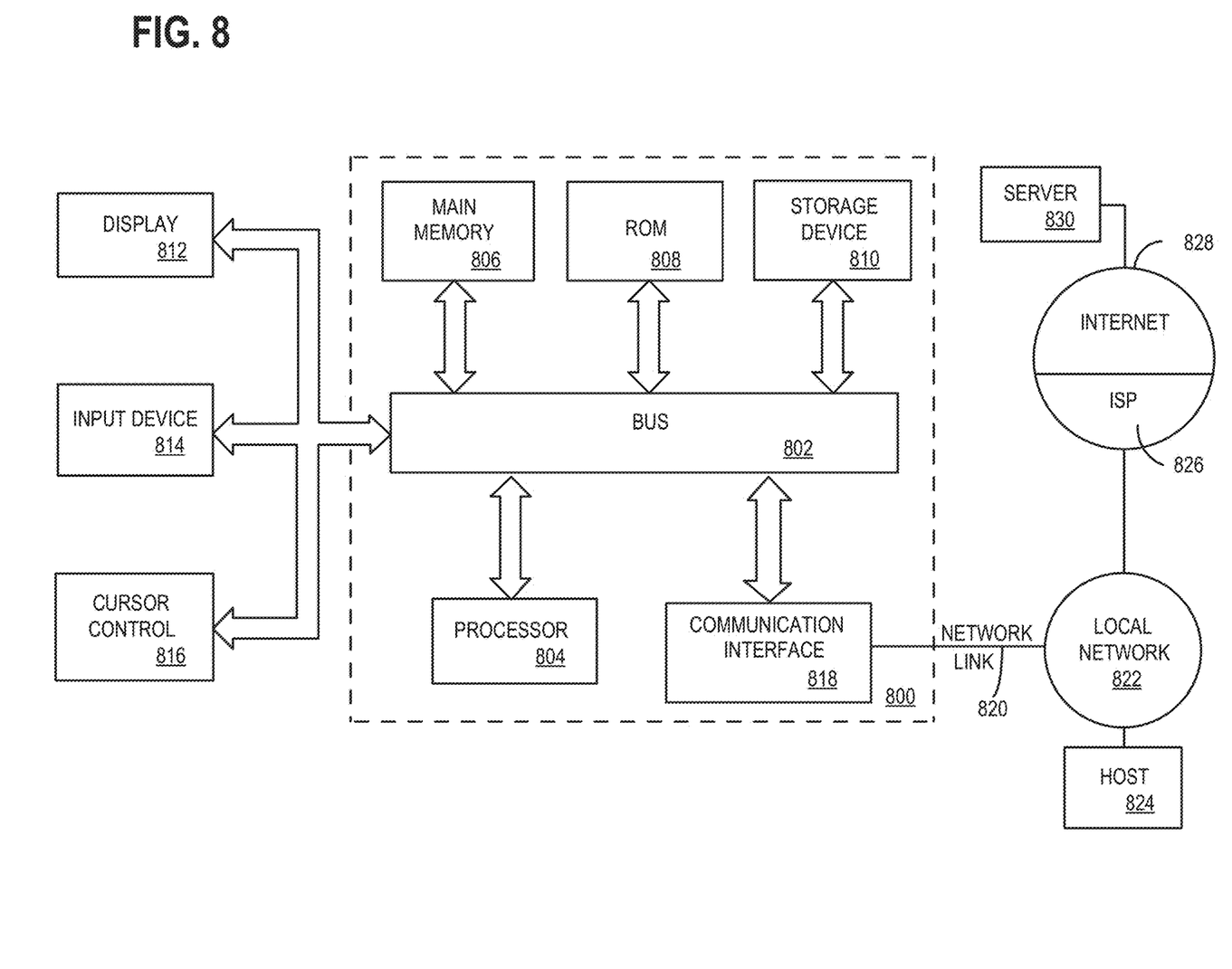
FIG. 8 is a block diagram that illustrates a computer system upon which an embodiment of the invention may be implemented.

As used herein, an "electronic document" is a document that is viewed and/or edited by a user using an electronic device such as, for example, computer system 800 of FIG. 8. In some cases, an electronic document can be converted to a tangible form such as by printing the contents of the electronic document on paper. Electronic documents may comprise text, tables, charts, graphics, and other elements, including executable elements such as hyperlinks. An electronic document may include tables, charts, and graphics imported from applications other than the application used to generate the electronic document. An electronic document may be stored in local memory of a computer or accessed by a computer via a network. An electronic document may be associated with various permissions such as edit and read-only permissions.

Upon adding the one or more charts to the electronic document, the author is able to remove any unwanted charts and the tabular data from the document. In some instances, readers or other authors of the document may be able to access at least the tabular data from which the chart was generated within the application.

Some embodiments may provide various technological advantages such as, for example, a simplified user interface for generating and presenting charts. The simplified user interface reduces the consumption of computing, network, and memory resources in part by reducing the number of applications needed to include a chart generating from tabular data in an electronic document. By generating the chart in the same application as the electronic document, users are better able to generate and communicate relevant information to their readers.

System Overview

Figure 1:
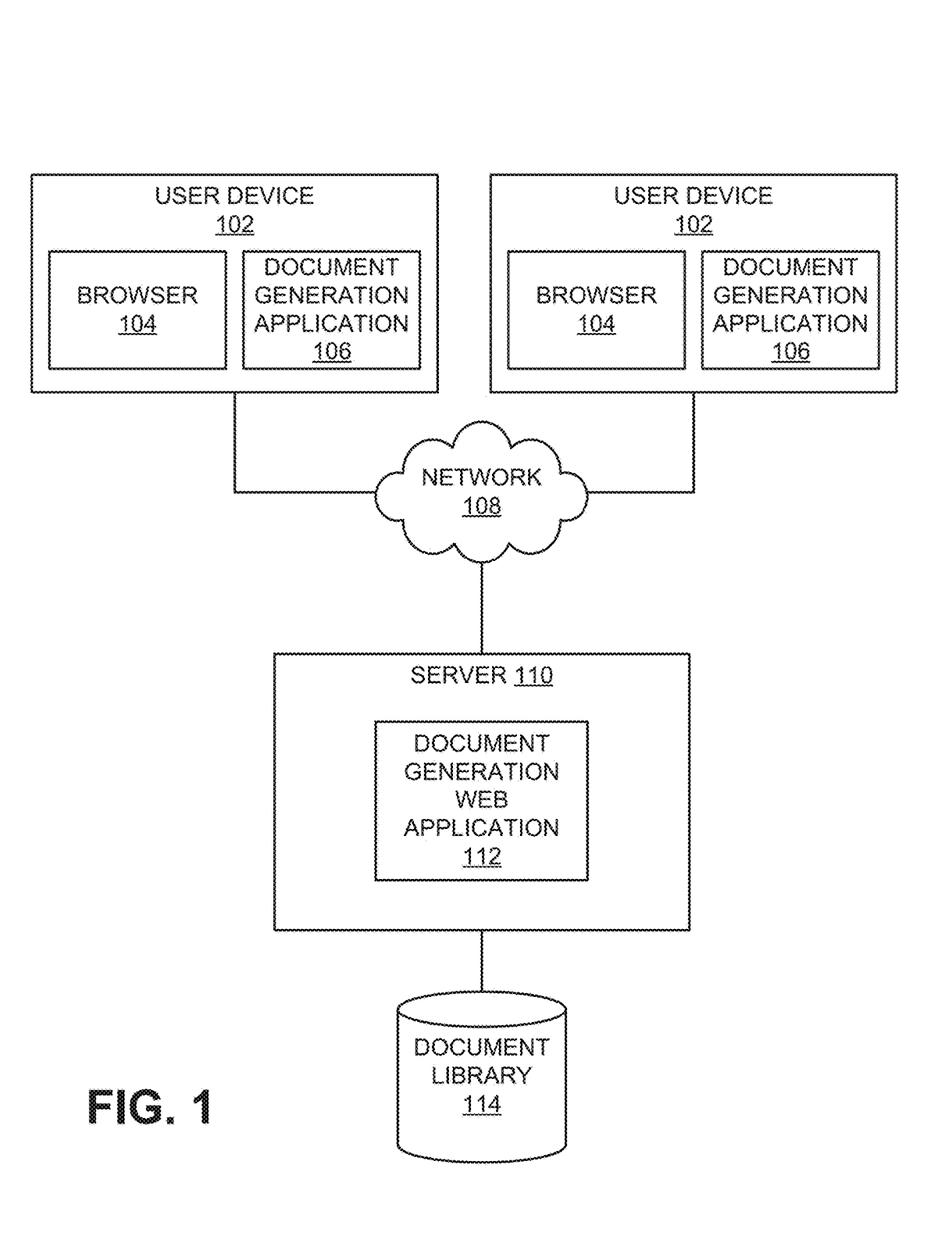
FIG. 1 is a block diagram of a network environment in which various embodiments may be practiced.

A system 100 comprises a plurality of computers and computing devices within a networked environment. The system 100 may host a cloud-based or web-based document generation application. The document generation application may provide word processing and chart generation capabilities via the Internet to one or more user devices. Using the system 100, multiple users on user devices can access, view, modify, and present an electronic document in real time. The multiple user computers can access and present edits made by other user devices as they are being made. The user devices may each be associated with a permission level with respect to the document, such as read-only or edit. The system 100 may further provide cloud-based document management services, such as those that allow users to store electronic documents in cloud storage such that the electronic document can be accessed by other users and/or user devices.

User devices 102 include consumer devices such as personal computers, laptop computers, tablet computers, and smartphones. The user devices 102 communicate via a network 108 and execute a browser 104 and/or a document generation application 106. The browser 104 is an application that, in part, accesses webpages via the Internet. The browser 104 may execute web applications comprising a set of webpages to perform tasks. For example, a web application may comprise a document generation web application 112 that allows a user to create, save, access, and edit electronic documents via the Internet. An example of a web application used to generate electronic documents is PAPER® by Dropbox, Inc. of San Francisco, Calif.

User devices 102 may execute a document generation application 106. The document generation application 106 may be stored and executed locally, at the user device 102. The document generation application 106 allows a user to create, save, access, and edit electronic documents with or without connecting to a network. The document generation application 106 may allow a user to import tables, charts, and graphics for inclusion in a document from local memory or via a network. The document generation application 106 may import tabular data and generate charts without leaving the document generation application 106. The document generation web application 112 accessed via browser 104 may share electronic documents with the document generation application 106 to store and access documents stored in cloud memory.

The document generation web application 112 may have more functionality than the document generation application 106. For example, the document generation web application 112 may allow multiple user devices 102 to access the same electronic document simultaneously and share changes to the electronic document in real time, where the document generation web application 112 makes changes to the electronic document in response to input received from user devices 102 in the system 100. The document generation web application 112 may allow users to share data across user devices, such as downloading tabular data from one user device 102 to another user device 102. Further a user device 102 need not include document generation application 106 to access the document generation web application 112.

The system 100 may facilitate document generation, document storage, and/or document retrieval via a network 108. The network 108 may include a local area network (LAN), the Internet, and/or another Wide Area Network (WAN). The network 108 may be accessed by user devices 102 and at least one server 110.

The server 110 may comprise one or more computers in a networked environment. In some embodiments, the server 110 may reside in a cloud computing environment. The server 110 hosts the document generation web application 112. The document generation web application 112 is accessed by user devices 102 via a browser 104. The document generation web application 112 allows user devices to generate an electronic document. The document generation web application 112 has numerous features such as document sharing, real time document editing, document management, and the like.

Notably, the document generation web application 112 and the document generation application 106 allow a user device to import tabular data from another electronic file and generate one or more charts from the tabular data without using another application, such as a spreadsheet or graphics application. The document generation web application 112 makes a series of determinations about imported tabular data, selects one or more chart types, and generates charts automatically, without human intervention, and without forcing the user to interact with a spreadsheet application. Because both the document generation web application 112 and document generation application 106 generate charts, document generation web application 112 and document generation application 106 are hereinafter referred to interchangeably.

A document library 114 comprises memory storing one or more electronic documents on behalf of the user devices 102. The document library 114 may be hosted within a cloud storage architecture. The electronic documents stored in the document library 114 are each associated with one or more user devices 102. The electronic documents may include text, graphics, tabular data, and/or at least one chart. The document library 114 may be accessed independently of the server 110 or the document generation web application 112.

Process Overview

When a user device 102 accesses an electronic document via the document generation web application 112, the user device 102 may modify the electronic document by adding text, graphics, tabular data, or charts. To access the electronic document, the user device 102 may log in to the document generation web application 112, select an existing electronic document from a document management interface or select an option to create a new electronic document. The electronic document may be provided within a user interface that comprises one or more menus containing selectable options. The menus may be static, that is, persistently appearing at a particular position in the user interface and containing a consistent set of options arranged in a persistent manner. Static menus may include options that allow a user to change the format of the electronic document.

The user interface may further include one or more contextual menus. The contextual menu may be provided in response to an input received from the user device 102. For example, a right click of a mouse, hovering over an area of the user interface, or an extended press on a touch screen may be received as an instruction to provide a contextual menu. A contextual menu may be provided for an extended period of time and may change position within the user interface in response to actions made by the user.

Figure 2:
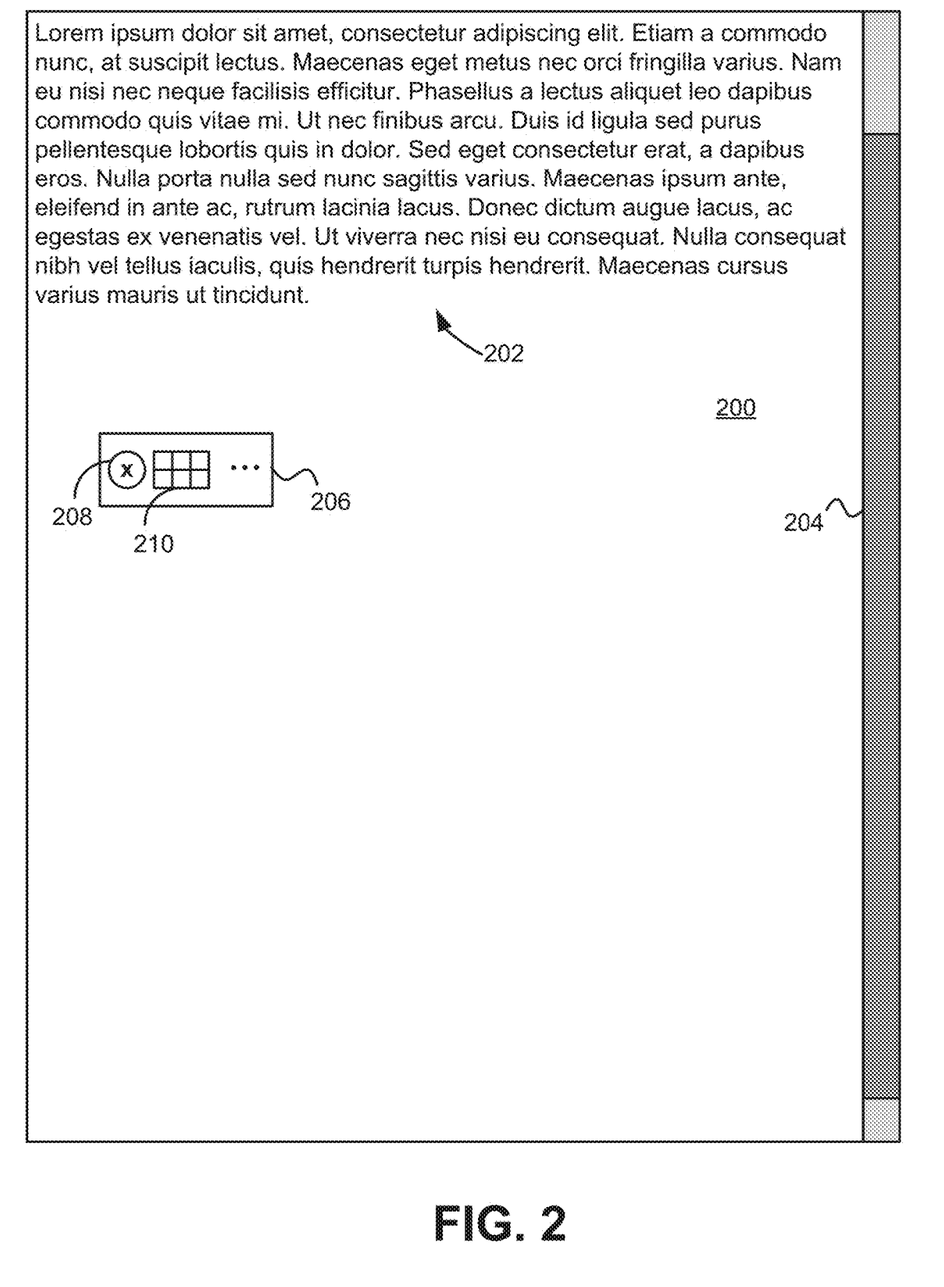
FIG. 2 is an example of an electronic document comprising a user interface element for accessing tabular data, according to various embodiments.

FIG. 2 is an example of a user interface 200 displaying an electronic document comprising a user interface element for accessing tabular data, according to various embodiments. The user interface 200 may be provided by the document generation web application 112 to the user device 102 via network 108. The user interface 200 does not include a static menu even though some embodiments include static menus. The user interface 200 comprises user-provided text 202 and a scroll bar 204 that indicates a relative portion of the electronic document displayed in the user interface 200.

User interface 200 comprises contextual menu 206 that is provided when a user hovers over a location on the user interface 200 for a threshold period of time. The contextual menu 206 may be provided for a particular period of time in response to the input. The contextual menu 206 may be closed in response to user input selecting close icon 208. The contextual menu 206 further comprises table icon 210. When selected, the table icon 210 instructs the document generation web application 112 to open a file navigation menu. In some embodiments, the table icon 210 may be selected from a static menu (not shown) in the user interface 200.

A file navigation menu (not shown) may comprise a window from which a user can select an existing file containing tabular data, such as a WINDOWS EXPLORER® window by Microsoft Corporation of Redmond, Wash. The file navigation menu may allow the user to select a file containing tabular data stored in document library 114, locally on user device 102, on another user device 102, or from an online source, such as a webpage. The tabular data may be stored in one of many available file types for tabular data. In some embodiments, the tabular data is stored in a Comma Separate Values (.csv) file format. The user device 102 selects a file containing tabular data that is then uploaded to the document generation web application 112.

Figure 3:
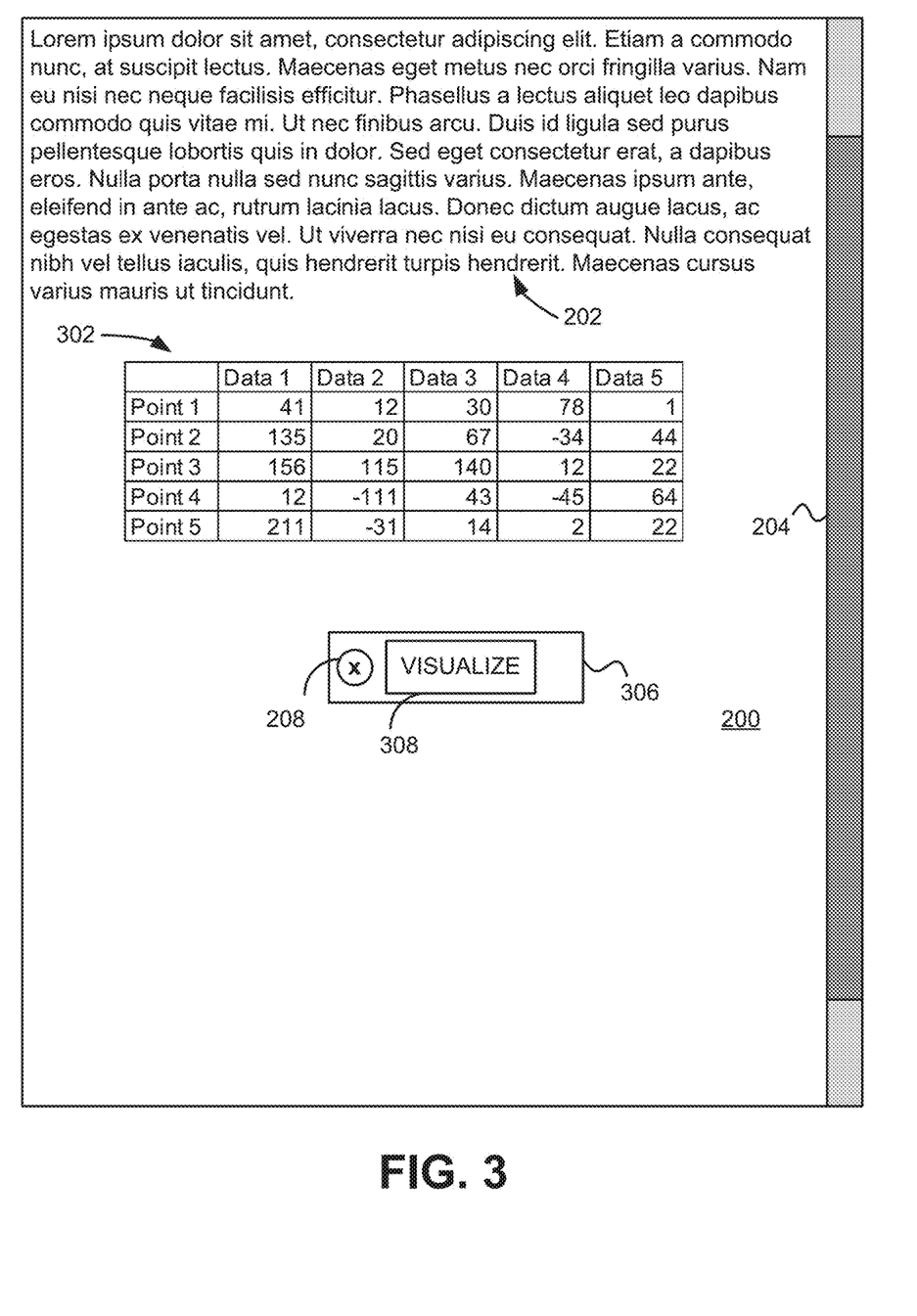
FIG. 3 is the electronic document comprising the tabular data, according to various embodiments.

FIG. 3 depicts the user interface 200 comprising the electronic document that includes tabular data imported from a file, according to various embodiments. In some embodiment, the user device 102 may generate the tabular data using the document generation web application 112. Upon uploading the file containing the tabular data, the document generation web application 112 generates a graphical table 302 of the tabular data within the electronic document. The table 302 comprises a plurality of rows and a plurality of columns. In the table depicted, the first field of each column and each row contains a label. The remaining fields of each column and row contain numerical data. The document generation web application hides the contextual menu 206 upon generating the table 302.

In some embodiments, the table 302 is an editable table that is a native part of the electronic document. In other word processing applications, an imported table is opened in, and associated with a second application such as a spreadsheet application. By generating the table 302 in the document generation web application 112 instead of a spreadsheet application, the table 302 is editable without invoking the spreadsheet application. Further, formatting of the table 302 is easier for the user because the formatting can be performed by the document generation web application 112 instead of using instructions relayed to the spreadsheet application.

The user interface 200 comprises a second contextual menu 306 that is provided upon generation of the table 302. The contextual menu 306 comprises icon 206 and a visualize icon 308. The visualize icon 308, when selected by user device 102, instructs the document generation web application 112 to generate one or more charts of the tabular data. The visualize icon 308 may be included in a static menu (not shown).

Figure 4:
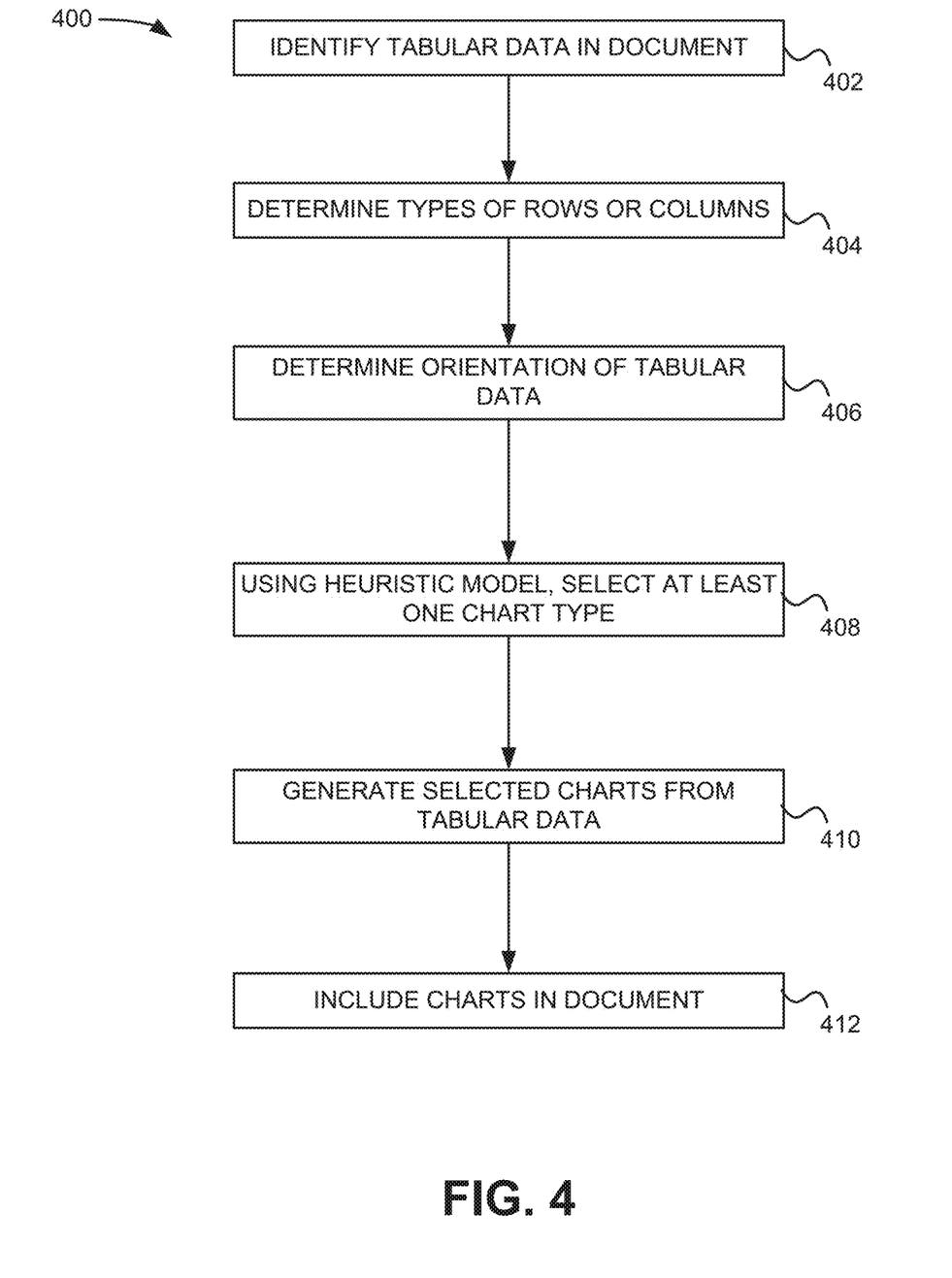
FIG. 4 is a flow chart of a process for adding a chart to an electronic document, according to various embodiments.

FIG. 4 is a flow chart of a process 400 for adding a chart to an electronic document, according to various embodiments. The process 400 is an algorithm that may be performed by the document generation web application 112. The process 400 requires no further input after the visualize icon 308 is selected. The process 400 results in one or more charts being added to the electronic document.

In an operation 402, the document generation web application 112 identifies the tabular data in the electronic document. The tabular data may be identified from the metadata included in the electronic document upon uploading the tabular data from the source. For example, the tabular data may be in a .csv format or another format known to be associated with tabular data.

In some instances, the tabular data is identified directly from an intermediate representation of the document known as the zone-attributed (ZA) text. ZA text is a unique and concise format that each data is put into special zones which then are tagged with their respective properties (such as "table" or "cell" or "graph" or "image", etc.) The document generation web application 112 may contains a parser that allows it to parse from other formats such as HTML elements (or even Excel, spreadsheets), thus a simple copy-paste of a HTML table (perhaps from some other webpage or application using html) into a document will trigger a parsing procedure that will convert the copy-paste into a ZA text and then subsequently render it as a table.

In some embodiments, the tabular data may include a plurality of rows and columns and the user may have a preference for which columns or rows are to be visualized. The user device 102 may optionally, input a selection of one or more cells within the table. For example, in tabular data comprising five columns, the user may select cells from two of the columns using a cursor before selecting the visualize icon 308. The process 400 continues using only the rows and columns associated with the selected cells.

In an operation 404, the document generation web application 112 determines types associated with rows or columns. The types may be determined using a heuristic model or artificial intelligence techniques. In a heuristic model, example heuristics are shown in TABLE 1.

TABLE 1

| RULE | TYPE |
|---|---|
| First field in row or column contains text? | LABEL |
| Fields contain text? | STRING |
| Fields contain text associated with places? | PLACE |
| Fields contain five digit whole numbers? | ZIP |
| Numerical Data in time format? | TIME |
| Data in date format? | DATE |
| Sum of row or column = 100 or 1? | PERCENTAGE |
| Repeating values in row or column? | FREQUENCY |
| Values are rational numbers with two places after a decimal point? | PRICE |
| Values consecutive whole numbers? | STEP |
| Values include +/ −? | WATERFALL |
| Real numbers? | NUMBER |
| Numbers with symbols ° ' " N\|W? | GPS COORDINATES |

The type "label" applies to the first field of the column or row. In some embodiments, the label field is disregarded when determining the type of the column or row. When a label is present, the label itself may be matched to another type. For example, if the label included in a first field of a column is "Time", the document generation web application 112 may determine that the type associated with the column is TIME.

The document generation web application 112 associates the field type STRING with fields containing text that do not match known texts. The columns associated with the type STRING may be deemed not chartable and are not included in the remainder of the process 400.

One example of known text is PLACE. Databases containing lists of places such as cities, counties, states, countries, and continents are widely available. If the text in the fields of the column or row matches one of these lists, the column or row is associated with the type PLACE.

A column or row containing 5-digit numbers between 10001 and 99999 may be associated with the type ZIP, corresponding to United States postal zip codes. The type ZIP is associated with the type PLACE.

The document generation web application 112 determines that time data is of the type TIME. Time data may be in various known formats such as HH:MM:SS.ss, HH:MM, a 12-hour format, and a 24-hour format. Numerical data associated with any one of the many known time formats are determined to be of the type TIME.

Similarly, dates can be expressed in a variety of formats. For example, dates can be expressed as YEAR-MONTH-DATE, DATE-MONTH-YEAR, MONTH-DAY-YEAR. Years may be recognized as consecutive or periodic four digit whole numbers. Months may be recognized as consecutive or periodic numbers in the range of 1-12 or as text such as the full names of the months or as abbreviations of month names. Days may be recognized as consecutive or periodic numbers in the range of 1-31. Other date data, such as week of the year, expressed as a whole number in the range 1-52, may be associated with the type DATE.

Other types may correspond to a type of chart normally associated with the type. For example, tables that contain values beginning with "+/−" may correspond to a waterfall chart. If values repeat within a row or column, the row or column may be determined to be of the type FREQUENCY.

In some embodiments, a row or column may correspond to two or more types. When a row or column is determined to correspond to two or more types, various techniques may be used to remove types until only one type is associated with the row or column. For example, more specific types, such as DATE or ZIP may be given priority over more general types such as STRING or STEP. The relative priority of the types based on specificity may be stored in a hierarchy that is accessed by the document generation web application 112.

When each row or column of the tabular data is assigned to at least one type, the document generation web application 112 determines the orientation of the tabular data in an operation 404. The orientation of the tabular data refers to whether the table is orientated such that the rows correspond to an x-axis or the y-axis of a chart. If the rows correspond to the x-axis, the table is row-oriented. The rows correspond to the y-axis, the table is column-oriented.

The orientation of the data is determined based on the types associated with the rows and columns. Certain types, such as TIME, PLACE, ZIP, and STEP are typically associated with the x-axis of charts. Other types, such as PERCENTAGE, PRICE, and NUMBER are typically associated with a y-axis. These associations may be stored in a look-up table, such as TABLE 2.

TABLE 2

| TYPE | AXIS |
|---|---|
| LABEL | X |
| STRING | X |
| PLACE | X |
| ZIP | X |
| TIME | X |
| DATE | X |
| PERCENTAGE | Y |
| FREQUENCY | Y |
| PRICE | Y |
| STEP | X |
| WATERFALL | Y |
| NUMBER | Y |

To determine the orientation of the tabular data, the types corresponding to the rows and columns are compared. The orientation of the tabular data is indicated by whether the more specific types are associated with columns or rows. Typically, if one of the rows or columns cannot be typed, or are typed using a less specific type like STRING, the tabular data is not oriented by rows or columns, respectively. If, for example, the rows are assigned more specific types DATE and PRICE, the table is row-oriented. If, for example, the columns are assigned types PLACE and NUMBER, the table is column-oriented.

In an operation 408, when the orientation of the tabular data is determined, using a heuristic model, the document generation web application 112 selects at least one chart type. The chart type may depend based on the types, particularly the types associated with an x-axis. In some embodiments, the data types are expressed as {x,y} couples. Tabular data with more than two columns or rows may associated with more than one chart type, resulting in more than one chart type being selected. For tabular data having multiple columns or rows, the same column or row may be coupled to more than one other row or column. Some of the heuristics that may be included in the heuristic model are shown in TABLE 3.

TABLE 3

| DATA TYPES IN ROWS OR COLUMNS | CHART TYPE |
|---|---|
| {DATE, PRICE} | LINE CHART |
| {DATE, PERCENTAGE} | PIE CHART |
| {DATE, NUMBER} | BAR CHART |
| {PLACE, PRICE} | BAR CHART |
| {PLACE, PERCENTAGE} | PIE CHART |
| {NUMBER, WATERFALL} | WATERFALL CHART |
| {ZIP, FREQUENCY} | BUBBLE CHART |
| {NUMBER, NUMBER} | SCATTER CHART |
| {STEP, NUMBER} | SCATTER CHART |
| INVENTORS: ANY HEURISTICS TO ADD? | |

In some embodiments, only a portion of the tabular data may be charted without further user input. The portion may be selected using a variety of heuristics.

In some embodiments, a user history associated with user device 102 may be accessed to select a chart type. If the user has previously requested charts of tabular data and did not remove charts of a particular chart type from the electronic document, the chart types are saved as preferences. For example, a teacher may, every quarter, prepare a bar graph showing a distribution of student grades corresponding to a {STEP, FREQUENCY} couplet. While {STEP, FREQUENCY} may be associated with multiple chart types including bar charts and pie charts, the stored preference for a bar chart causes the chart type BAR CHART to be selected.

Once two or more chart types are selected, the document generation web application 112 generates the selected charts in the operation 410. The selected charts are generated by populating x-axis values and plotting y-axis values. In some embodiments, charts are generated from the intermediary representation (ZA text as mentioned above) in real-time using JavaScript, CSS, DOM and SVG; all is being calculated and rendered in the browser as the document is loading. The chart is then re-rendered as a static image on the app server so that it can be sent as a part of the preview of the document (using email for example).

Some tabular may require additional processing. For example, in a line graph comprising more than one trend line, one row or column of data corresponding to a y-axis may be orders of magnitude larger than the other rows or columns. In such embodiments, more than one line graph may be generated. In bar charts for tabular data of type FREQUENCY, counts of each value may be calculated for populating the x-axis. These additional steps are dictated by chart type and the techniques used to generate the chart type.

In some embodiments, a waterfall chart may be generated using the following algorithm:

```
// drawRectangle is a primitive drawing function that draws a rectangle
// on the screen in browser. This can be a SVG primitive or perhaps some
enhanced
// function of other framework.
// (x, y) is the left lower corner of the rectangle
// x goes left to right
// y goes bottom up
// color is used to differentiate the increase vs decrease
function drawRectangle(x, y, width, height, color);
// Algorithm how to draw a waterfall chart follows.
// Note1: Assumption is that both x and y axes are already drawn.
// Load data.
var data: number[ ] = getDataFromZAText("myTableId");
// Set pointer to origin of the chart.
var pointer: {x: number, y: number} = { x: 0, y: 0};
// This variable will contain the sum after each step of the algorithm.
var runningSum: number = 0;
// Each column will be 100 pixels
const COLUMN_WIDTH = 100;
// traverse over all data and draw the rectangles as we go.
for (var i = 0; i < data.length; i++) {
  var color: string;
  if (i == 0) {
    // Making first column green.
    color = "green";
  } else {
    color = data[i] < 0 ? "red" : "blue";
  }
  drawRectangle(pointer.x, pointer.y, COLUMN_WIDTH, data[i],
  color);
  // Advance x-coordinate
  pointer.x += COLUMN_WIDTH;
  // The y-coordinate for the next element is equal to the running sum.
  runningSum += data[i];
  pointer.y = runningSum;
}
// At the end, draw one last column that will go from the
last recorded value
// back to the X-axis (its y-coordinate is 0), i.e. to close the loop.
drawRectangle(pointer.x, 0, COLUMN_WIDTH, runningSum, "green");
```

Another algorithm for drawing waterfall charts is as follows:

```
// drawRectangle is a primitive drawing function that draws a rectangle
// on the screen in browser. This can be a SVG primitive or perhaps
some enhanced
// function of other framework.
// (x, y) is the left lower corner of the rectangle
// x goes left to right
// y goes bottom up
// color is used to differentiate the increase vs decrease
function drawRectangle(x, y, width, height, color);
--------
// Algorithm how to draw a waterfall chart follows.
// Note1: Assumption is that both x and y axes are already drawn.
// Load data.
var data: number[ ] = getDataFromZAText("myTableId");
// Set pointer to origin of the chart.
var pointer: {x: number, y: number} = { x: 0, y: 0};
// This variable will contain the sum after each step of the algorithm.
var runningSum: number = 0;
// Each column will be 100 pixels (this is just arbitrary really).
const COLUMN_WIDTH = 100;
// Traverse over all data and draw the rectangles as we go.
for (var i = 0; i < data.length; i++) {
  var color: string;
  if (i == 0) {
    // Making first column green.
    color = "green";
  } else {
    color = data[i] < 0 ? "red" : "blue";
  }
  drawRectangle(pointer.x, pointer.y, COLUMN_WIDTH, data[i], color);
  // Advance x-coordinate
  pointer.x += COLUMN_WIDTH;
  // The y-coordinate for the next element is equal to the running sum.
  runningSum += data[i];
  pointer.y = runningSum;
}
// At the end, draw one last column that will go from the last
recorded value
// back to the X-axis (its y-coordinate is 0), i.e. to close the loop.
drawRectangle(pointer.x, 0, COLUMN_WIDTH, runningSum, "green");
```

The document generation web application 112 adds the generated charts to the electronic document in an operation 412. The charts are added directly into the electronic document, adjacent to the table 302. The charts may be of different types and may depict data from the entire tabular data or a portion of the tabular data.

Figure 5:
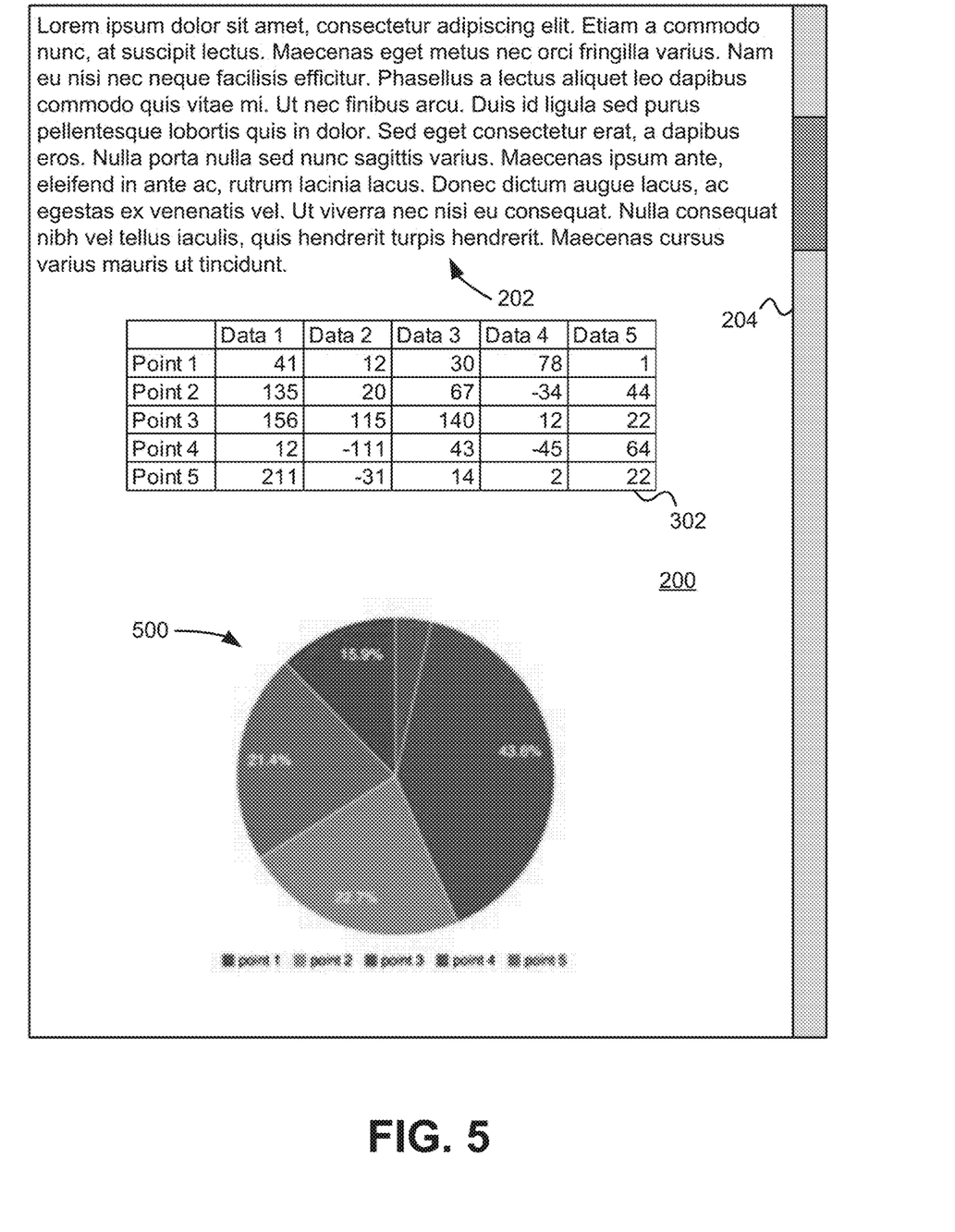
FIG. 5 is the electronic document including the tabular data and a first example chart, according to various embodiments.
Figure 6:
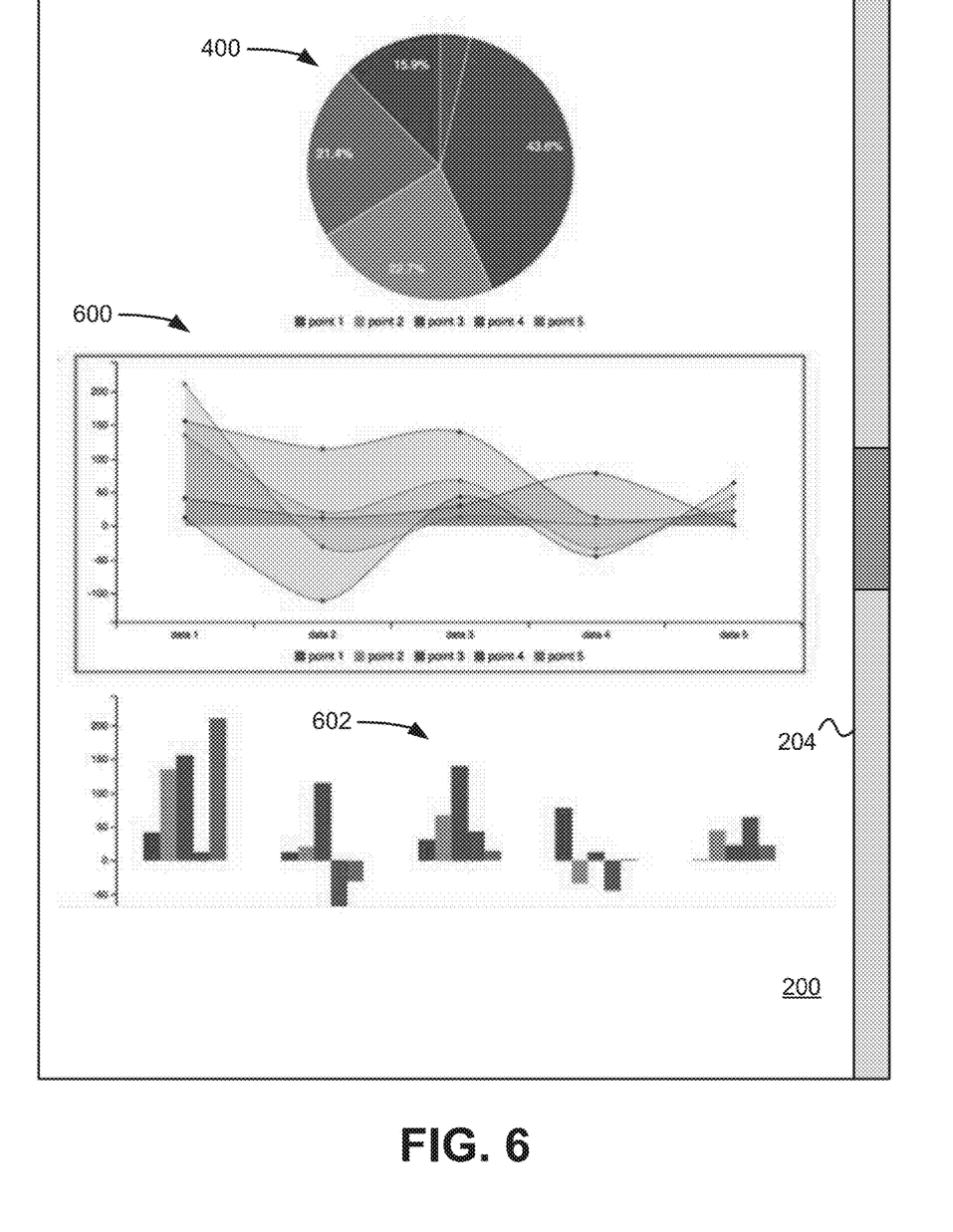
FIG. 6 is a further portion of the electronic document comprising the first example chart, a second example chart, and a third example chart.

FIG. 5 is the electronic document including the tabular data 302 and a first example chart 500, according to various embodiments. The example chart 500 is a pie chart. FIG. 6 is a further portion of the electronic document comprising the first example chart 500, a second example chart 600 which is a line chart, and a third example chart 602 which is a bar chart. In some embodiments, a user device 102 may provide an instruction, via a contextual menu (not shown) to chart the inverse of the charted valued by switching the x-axis and y-axis and repeating steps 410 and 412 of the process 400.

Figure 7:
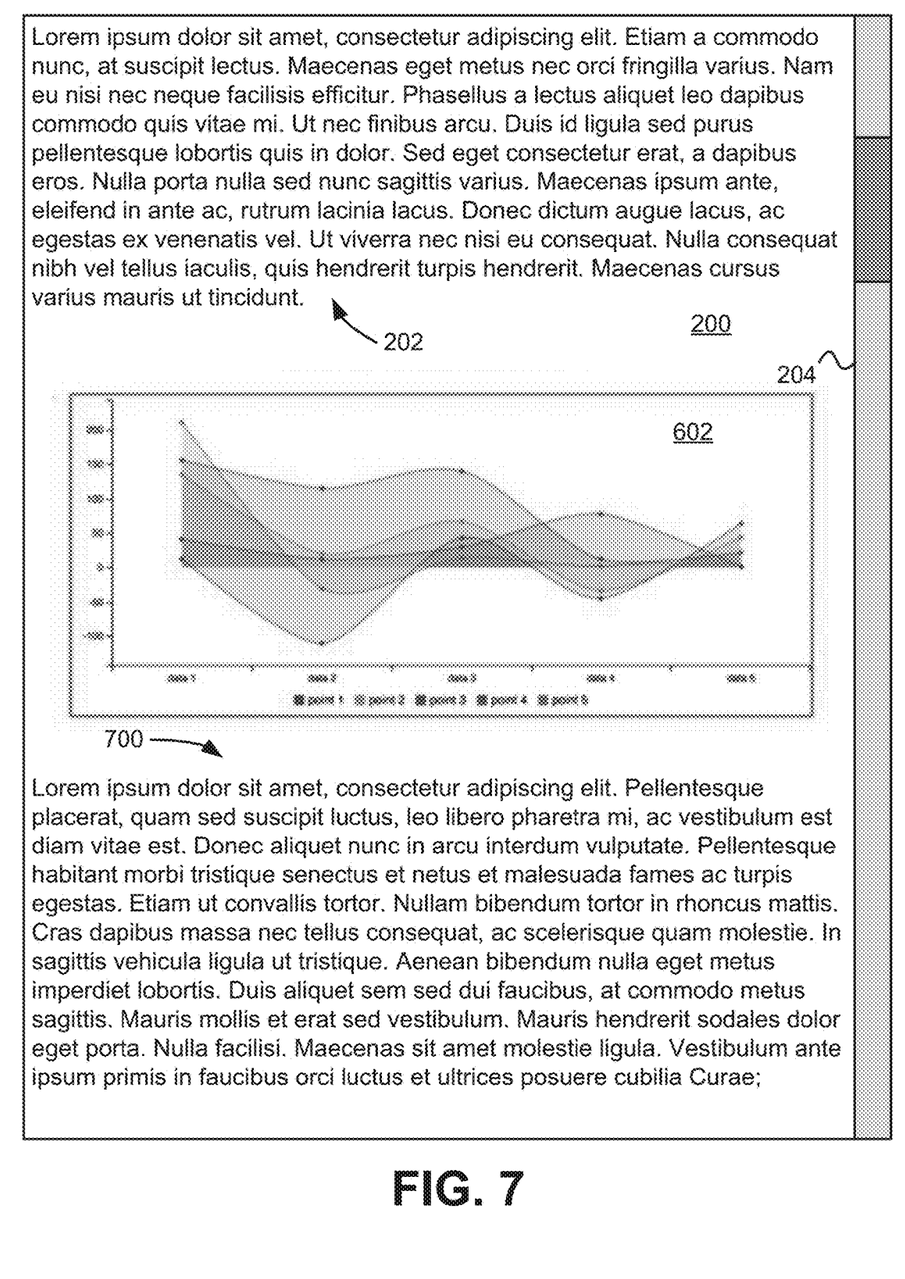
FIG. 7 is the electronic document including the second example chart.

A user device 102 may further provide instructions to remove one or more of the generated charts and the table 302. FIG. 7 is the electronic document including the second example chart 600 where the table 302, and charts 400 and 602 have been removed. FIG. 7 further includes new text received from the user device 102.

In some embodiments, the tabular data is stored in association with the electronic document. The tabular data may be accessed via an option in a contextual menu associated with the chart. When instructed to do so, the document generation web application 112 accesses the tabular data and re-generates the table 302. The table 302 may be inserted into the electronic document adjacent to the chart generated from the tabular data. By showing the table 302, the user device 102 may modify one or more cells within the tabular data. When modified, the document generation web application 112 repeats operation 410 and 412 to automatically update the chart with the new data. The user device 102 may then instruct the document generation web application 112 to remove the table 302 from the electronic document. Thus, the user can update a chart entirely within the document generation web application 112. Further, using the document generation web application 112, other users with edit or read-only permission may access the tabular data used to generate charts without requiring access to a separate data file. Users with edit permissions may change the tabular data while users with read-only permissions may only view the tabular data.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    at one or more computing devices comprising one or more processors and memory storing one or more programs executed by the one or more processors to perform the method, performing operations comprising:
    obtaining tabular data organized into a plurality of columns and a plurality of rows;
    within a document generation application, associating each of the plurality of columns and each of the plurality of rows with one predefined data type of a plurality of predefined data types;
    wherein associating a particular column or row with one predefined data type of the plurality of predefined data types is based on:
        determining that tabular data in the particular column or row encompasses two or more predefined data types of the plurality of predefined data types,
        accessing a hierarchy of predefined data types to determine which of the two or more predefined data types is a most specific predefined data type among the two or more predefined data types, the hierarchy having two or more hierarchical levels, each predefined data type of the two or more predefined data types belonging to a different hierarchical level of the two or more hierarchical levels, and
        selecting, as the one predefined data type to associate with the particular column or row, the predefined data type of the two or more predefined data types that is the most specific data type according to the hierarchy of predefined data types;
    determining that the tabular data is one of: column-oriented or row-oriented, based on the predefined data types associated with the plurality of columns and the predefined data types associated with the plurality of rows;
    based on whether the tabular data is determined to be column-oriented or row-oriented, applying a heuristic model to the predefined data types associated with the plurality of columns or the plurality of rows, respectively, to select a chart type of a plurality of chart types; and
    automatically generating a chart of the selected chart type comprising the tabular data.

2. The method of claim 1, further comprising generating a graphical table from the tabular data and adding the graphical table to an electronic document generated by the document generation application.

3. The method of claim 1, further comprising adding the chart to an electronic document generated by the document generation application.

4. The method of claim 1, further comprising:
    storing the tabular data in association with an electronic document comprising the chart and not including the tabular data;
    in response to receiving a request for the tabular data via the document generation application, generating a graphical table of the tabular data within the electronic document.

5. The method of claim 4, further comprising:
    receiving an instruction to modify the tabular data;
    within the document generation application, automatically re-generating the chart of the selected chart type depicting a graphical representation of the tabular data.

6. The method of claim 1, further comprising:
    adding the chart to an electronic document generated by the document generation application;
    providing an inverse graphing option that, in response to being selected, associates first data associated with an x-axis of the chart with a y-axis and associates second data associated with the y-axis of the chart with the x-axis;
    generating another chart wherein the first data is associated with the y-axis of the other graph and the second data is associated with the x-axis of the other chart.

7. The method of claim 1, wherein selection of a chart type of a plurality of chart types is based, in part, on a stored preference of a user device and associated with the data types associated with remaining rows of the plurality of rows and remaining columns of the plurality of columns.

8. The method of claim 1, wherein:
    the tabular data is determined to be column-oriented; and
    the chart type selected according to the heuristic model is a waterfall chart based on the data types associated with the plurality of columns being number and the data types associated with the plurality of rows being waterfall.

9. The method of claim 1, wherein the two or more predefined data types encompassed by tabular data in the particular column or the particular row includes a DATE data type and a STRING data type; and wherein the DATE data type is determined to be the most specific predefined data type among the two or more predefined data types according to the hierarchy of the plurality of predefined data types.

10. A system comprising:
    one or more processors; and
    non-transitory computer-readable memory storing one or more programs executed by the one or more processors to perform operations comprising:
    obtaining tabular data organized into a plurality of columns and a plurality of rows;
    within a document generation application, associating each of the plurality of columns and each of the plurality of rows with one predefined data type of a plurality of predefined data types;
    wherein associating a particular column or row with one predefined data type of the plurality of predefined data types is based on:
        determining that tabular data in the particular column or row encompasses two or more predefined data types of the plurality of predefined data types,
        accessing a hierarchy of predefined data types to determine which of the two or more predefined data types is a most specific predefined data type among the two or more predefined data types, the hierarchy having two or more hierarchical levels, each predefined data type of the two or more predefined data types belonging to a different hierarchical level of the two or more hierarchical levels, and selecting, as the one predefined data type to associate with the particular column or row, the predefined data type of the two or more predefined data types that is the most specific data type according to the hierarchy of predefined data types;

determining that the tabular data is one of: column-oriented or row-oriented, based on the predefined data types associated with the plurality of columns and the predefined data types associated with the plurality of rows;

based on whether the tabular data is determined to be column-oriented or row-oriented, applying a heuristic model to the predefined data types associated with the plurality of columns or the plurality of rows, respectively, to select a chart type of a plurality of chart types; and automatically generating a chart of the selected chart type comprising the tabular data.

11. The system of claim 10, wherein the non-transitory computer-readable memory storing the one or more programs executed by the one or more processors to perform further operations generating a graphical table from the tabular data and adding the graphical table to an electronic document generated by the document generation application.

12. The system of claim 10, wherein the non-transitory computer-readable memory storing the one or more programs executed by the one or more processors to perform further operations comprising adding the chart to an electronic document generated by the document generation application.

13. The system of claim 10, wherein the non-transitory computer-readable memory storing the one or more programs executed by the one or more processors to perform further operations comprising:

storing the tabular data in association with an electronic document comprising the chart and not including the tabular data;

in response to receiving a request for the tabular data via the document generation application, generating a graphical table of the tabular data within the electronic document.

14. The system of claim 13, wherein the non-transitory computer-readable memory storing the one or more programs executed by the one or more processors to perform further operations comprising:

receiving an instruction to modify the tabular data;

within the document generation application, automatically re-generating the chart of the selected chart type depicting a graphical representation of the tabular data.

15. The system of claim 10, wherein the non-transitory computer-readable memory storing the one or more programs executed by the one or more processors to perform further operations comprising:

adding the chart to an electronic document generated by the document generation application;

providing an inverse graphing option that, in response to being selected, associates first data associated with an x-axis of the chart with a y-axis and associates second data associated with the y-axis of chart with the x-axis;

generating another chart wherein the first data is associated with the y-axis of the other graph and the second data is associated with the x-axis of the other chart.

16. The system of claim 10, wherein the non-transitory computer-readable memory storing the one or more programs executed by the one or more processors to perform operations comprising selection of a chart type of a plurality of chart types is based, in part, on a stored preference of a user device and associated with the data types associated with remaining rows of the plurality of rows and remaining columns of the plurality of columns.

17. The system of claim 10, wherein:

the tabular data is determined to be row-oriented; and the chart type selected according to the heuristic model is a waterfall chart based on the data types associated with the plurality of rows being number and the data types associated with the plurality of columns being waterfall.

18. The system of claim 10, wherein the two or more predefined data types encompassed by tabular data in the particular column or the particular row includes a PRICE data type and a NUMBER data type; and wherein the PRICE data type is determined to be the most specific predefined data type among the two or more predefined data types according to the hierarchy of the plurality of predefined data types.

* * * * *